United States Patent Office 3,504,007
Patented Mar. 31, 1970

3,504,007
PROCESS FOR PREPARING AMINOSILANES
William John Owen, Penarth, Glamorgan, and Bryan Ewart Cooper, Bridgend, Glamorgan, Wales, assignors to Midland Silicones Limited, Reading, Berkshire, England
No Drawing. Filed May 17, 1967, Ser. No. 644,427
Claims priority, application Great Britain, May 23, 1966, 22,921/66
Int. Cl. C07f 7/10
U.S. Cl. 260—448.2     6 Claims

ABSTRACT OF THE DISCLOSURE

A haloalkylorganosilane is reacted with an alkali metal organoamide to produce an organosilane having organofunctional groups bonded to silicon.

BACKGROUND OF THE INVENTION

This invention relates to a process for preparing organosilicon compounds and to certain new organosilicon compounds so prepared.

It has been discovered that an organosilicon compound (1) of the general formula $R_aSi[ZY]_{4-a}$ wherein each R is a monovalent radical selected from the group consisting of hydrocarbon radicals, hydrocarbonoxy radicals and halogenohydrocarbon radicals, $a$ is 1, 2 or 3, Z is a divalent saturated radical selected from the group consisting of aliphatic and cycloaliphatic hydrocarbon radicals and Y is a halogen atom, will react with (2) an alkali metal organoamide of the general formula XX'NQ wherein X is a hydrogen atom, an alkyl radical or an aryl radical and X' is an alkyl radical or an aryl radical and Q is an alkali metal atom to produce organosilanes of the general formula $R_aSi[ZNX'X]_{4-a}$ where R, Z, X, X' and $a$ are as above defined.

The organosilicon reactant (1) defined by the formula $R_aSi[ZY]_{4-a}$ are known materials prepared by known methods. In the formula each R represents monovalent hydrocarbon radicals bonded to silicon through Si—C bonding such as alkyl radicals such as methyl, ethyl, propyl, octyl and octadecyl radicals; alkenyl radicals such as vinyl, decenyl allyl, octadecenyl and cyclohexenyl radicals; aryl radicals such as phenyl, naphthyl and xenyl radicals; aralkyl radicals such as benzyl, phenylethyl and xylyl radicals; alkaryl radicals such as tolyl and dimethylphenyl radicals; and cycloaliphatic radicals such as cyclobutyl, cyclohexyl, cyclohexenyl, cyclopropenyl and cyclooctyl. R can also represent any hydrocarbonoxy radical as exemplified by the radicals listed above bonded to silicon through an oxygen atom, e.g. methoxy, ethoxy, phenoxy and cyclohexyloxy as well as halogenated derivatives of the hydrocarbon radicals, e.g. chloromethyl, 3,3,3-trifluoropropyl, 3,3,4,4,5,5,5-heptafluoropentyl, perchlorophenyl, 3,4-dibromocyclohexyl, α,α,α-trifluorotolyl, 2,4-dibromobenzyl, difluoromonochlorovinyl, α,β,β-trifluoro-α-chlorocyclobutyl, and 2-iodocyclopent-3-yl radicals. As noted, there can be 1, 2 or 3 of the R groups per silicon atom (i.e. $a$ can be 1, 2 or 3) and these R groups can be the same or different and mixtures of silanes can be employed.

Each Z in the formulae employed herein can be any divalent saturated aliphatic or cycloaliphatic radical. The radicals represented by Z can be exemplified as —(CH$_2$)$_x$— where $x$ is a whole number, preferably 1-18 and cycloaliphatic radicals. Specific examples include methylene, ethylene, propylene, polymethylene, cyclohexylene, cyclooctadecylene and of course branched equivalents such as —CH$_2$CH(CH$_3$)CH$_2$—,

—CH$_2$CH$_2$C(CH$_3$)$_2$CH$_2$—

—CH$_2$CH(C$_3$H$_7$)CH$_2$— and $\underline{C}$H$_2$CH$_2$CH(C$_2$H$_5$)CH$_2$CH$_2$CH(C$_2$H$_5$)CH$_2$CH—

Each Z is bonded to silicon through an Si—C bond and preferably contains 1–18 carbon atoms. The Y group bonded to Z is a halogen atom and can be fluorine, chlorine, bromine, iodine or even astatine but the chlorine is preferred because of availability and ease of reaction. It is apparent there can be 1, 2 or 3 of the —ZY groups per silicon atom because 4−$a$ can be 1, 2 or 3 as the value of $a$ is 3, 2 or 1 respectively.

Specific examples of the silane reactant defined by the formula $R_aSi[ZY]_{4-a}$ include chloromethyltrimethylsilane [R is CH$_3$, $a$ is 3, Z is —CH$_2$— and Y is Cl], di(bromoethyl)dibutylsilane, gamma-chloropropylmethyldioctylsilane, chlorobutyltriethylsilane, trichlorobutylphenylsilane and chloromethylbromoethylpropylphenylsilane.

The alkali metal organoamide reactant (2) is represented by the formula XX'NQ where X is a hydrogen atom, an alkyl radical (—C$_a$H$_{2a+1}$ where $a$ is 1–18) or an aryl radical, X' is an alkyl radical or aryl radical as exemplified above and Q is an alkali metal atom such as lithium, sodium, potassium, rubidium and cesium, particularly lithium, sodium or potassium. Particularly useful are those compounds where X and X' are aryl radicals.

Compounds employed as reactant (2) can be prepared by any convenient method, one preferred route to such compounds comprises reacting an alkyl or aryl lithium compound such as phenyl lithium and butyl lithium with the appropriate amino compound, for example a diarylamine such as diphenylamine. In one alternative method the alkali metal derivative can be obtained by reacting for example the diarylamine with sodamide.

The reaction of the halohydrocarbon organosilicon compound (1) and the alkali metal compound (2) to provide the desired aminoorganosilicon compounds can be effected, in general, at any temperature between about 30° C. and the reflux temperature of the reaction mixture. In some cases, however, the reaction is too slow at temperatures below about 60° C. to be of practical interest and we prefer to perform the reaction at about the reflux temperature of the reaction mixture, the relative proportions of the reactants is not critical although the best results are generally obtained employing a slight stoichiometric excess of the alkali metal organoamide compound (2).

If desired the reaction mixture can contain one or more solvents. In one method of performing the process of this invention it has been found convenient to prepare the alkali metal derivative of the diarylamine in a solvent such as diethylether, thereafter adding the halohydrocarbon organosilicon compound to the solvent solution of the amine derivative and inducing the reaction. On completion of the reaction the desired product can be recovered by any of the conventional techniques, for example by retrieval of the solvent solution of the product which is then fractionated to obtain the desired organosilicon compound.

When a low boiling solvent such as diethylether is employed it may be necessary to carry out the reaction under pressure to achieve the desired reaction temperature. The use of high pressures can, however, be avoided in some cases by refluxing all or some of the low boiling solvent with one which boils at a higher temperature.

The novel compounds of this invention are defined by the general formula $R_aSi[ZNX_2]_{4-a}$, wherein R, Z and $a$ are as hereinbefore defined and each X is an aryl radical.

The aminoorganosilicon compounds prepared according to the process of this invention can be employed for forming water repellent coatings on fibrous materials or as sizes for fibrous glass. The above defined novel organosilicon compounds have been found to be particularly useful as additives to organic or organosilicon materials to improve the thermal and oxidative stability thereof. It has been found possible to improve significantly the oxidative stability of hydrocarbon lubricating oils by the addition of minor amounts thereto of these novel compounds. Having regard to this particular property the preferred compounds according to the invention are those in which the R radicals are such as to render the organosilicon compound compatible with the organic material in which it is to be incorporated. For example, the preferred organosilicon compounds for use as oxidation stability additives with mineral lubricating oils are those in which at least some of the R substituents are the butyl or the higher hydrocarbon radicals.

The following examples illustrate the invention.

EXAMPLE 1

Diphenylamine (50.1 g., 0.3 mole) in 100 ml. of diethylether was added to a flask containing n-butyl lithium which had been prepared by reacting lithium (4.2 g., 0.6 g. atom) and butyl bromide (41.4 g., 0.3 mole), the mixture thereafter being heated under reflux for 2 hours. Chloromethyl-dibutylmethylsilane (29 g., 0.141 mole) was then added, the ethereal solvent replaced by xylene and the mixture refluxed for 40 hours. After reflux the reaction mixture was allowed to cool, water was added and the organic layer recovered and dried. On distillation under vacuum to remove the xylene this layer yielded diphenylaminomethyl-methyldibutylsilane having a boiling point in the range 160°–170° C. at 0.3–0.5 mm. Hg pressure, and $N_D^{25}=1.5485$.

EXAMPLE 2

Phenyl lithium was prepared in a flask by reacting lithium pellets (4.05 g., 0.584 mole) with bromobenzene (43.6 g., 0.278 mole) in dry diethylether at reflux temperature.

Diphenylamine (47 g., 0.278 mole) in 100 ml. diethylether was added slowly to the phenyl lithium solution maintaining the temperature of the mixture in the range from 20–25° C. by the application of external cooling. The addition of the diphenylamine was completed and the reaction mixture was then heated to reflux temperature for a period of 6½ hours, stirred at room temperature for a further 16 hours and trimethylbromoethylsilane (50 g., 0.278 mole) then added, there being a slight evolution of heat during the addition step. After stirring for 30 hours and being allowed to stand for 65 hours, the mixture was poured into a mixture of ice and water and the organic layer separated, and dried over $MgSO_4H_2O$.

On fractionation under vacuum the organic layer yield 1-diphenylamino-2-trimethylsilyl-ethane,

[(CH_3)_3SiCH_2CH_2N(C_6H_5)_2]

B.P. 107° C./0.1 mm. Hg $N_D^{22}$ 1.5671.

Analysis of the product indicated the presence of Si=10.82%, C=75.9% and H=8.66%. The calculated values for $SiC_{17}H_{23}N$ are Si=10.4%, C=75.8% and H=8.55%.

EXAMPLE 3

Diphenylamine (50.1 g., 0.3 mole) in 100 ml. of diethylether was added to a flask containing n-butyl lithium which had been prepared by the method described in Example 1 and the mixture heated under reflux for two hours. Gamma-chloropropylmethyldibutylsilane (50 g., 0.176 mole) was then added to the flask and the reaction mixture heated under reflux for 40 hours. At the end of this period the mixture was allowed to cool and water added thereto. The organic layer was then recovered, dried and fractionated to yield 1-diphenylamino-3-methyldibutylsilyl-propane,

[CH_3(C_4H_9)_2SiCH_2CH_2CH_2N(C_6H_5)_2]

B.P. 170–173°/0.3 mm.

EXAMPLE 4

Aniline (28.9 g., 0.3 mole) in 50 ml. ether was added to a phenyl lithium (0.3 mole) solution in ether and the mixture heated under reflux for 2 hrs. 1 - bromo-2-trimethylsilyl-ethane (36.2 g., 0.2 mole) was added, the ether replaced by tetrahydrofuran and the mixture heated under reflux for 20 hrs.

The mixture was allowed to cool, water added and the dried organic layer fractionated to give 1-phenylamino-2 - trimethylsilylethane, [(CH_3)_2SiCH_2CH_2NHC_6H_5], (18.5 g., 49%) B.P. 106°/2.5 mm.

EXAMPLE 5

Equivalent results were achieved and the products listed in column II below were obtained when the silanes listed in column I were substituted for the (chloromethyl) dibutylmethylsilane in the process of Example 1:

| Column I, Silane Reactant | Column II, Product |
|---|---|
| (ClCH_2)_2SiCH_3(C_4H_9) | [(C_6H_5)_2NCH_2]_2SiCH_3(C_4H_9) |
| (ClCH_2)_3SiCH_3 | [(C_6H_5)_2NCH_2]_3SiCH_3 |
| ClCH_2SiCH_3(C_6H_5)_2 | (C_6H_5)_2NCH_2SiCH_3(C_6H_5)_2 |
| ClC_4H_8SiCH=CH_2(C_6H_5) (CH_3) | (C_6H_5)_2NC_4H_8SiCH=CH_2(C_6H_5) \| CH_3 |
| ClCHCH_2CH_2CHPi(CH_3)_3 | (C_6H_5)_2NCH(CH_2)_3CHSi(CH_3)_3 |
| [ClCH(CH_2)_5CH]_2SiCH_3(C_6H_5) | [(C_6H_5)_2NCH(CH_2)_5CH]_2SiCH_3(C_6H_5) |

EXAMPLE 6

Equivalent results were achieved when Example 5 was repeated employing the bromo-, fluoro- and iodoalkylsilanes in place of the chloroalkylsilanes.

EXAMPLE 7

Equivalent results were achieved when Example 2 was repeated employing in place of the lithium diphenylamide [(C_6H_5)_2NLi] an equivalent amount of each of the following: CH_3HNLi, C_6H_5HNLi, CH_3(C_6H_5)NLi, (C_6H_5)_2NNa, (C_6H_5)_2NK, (C_6H_5)_2NRb, (C_6H_5)_2NCs, (CH_3)_2NK, CH_3HNK, C_6H_{13}(C_6H_5)NLi and $C_6H_5(C_2H_5)NLi$ That which is claimed is:

1. A process for preparing organosilicon compounds which comprises reacting (1) an organosilicon compound of the general formula $R_aSi[ZY]_{4-a}$ wherein each R is a monovalent hydrocarbon radical, a monovalent hydrocarbonoxy radical or a monovalent halohydrocarbon radical, $a$ has a value of 1, 2 or 3, Z is a divalent saturated aliphatic or cycloaliphatic hydrocarbon radical and Y is a halogen atom, with (2) a compound of the general formula XX′NQ wherein each X is a hydrogen atom, an alkyl radical or an aryl radical, each X′ is an alkyl or aryl radical, and Q is an alkali metal atom whereby there is produced a silane of the formula $R_aSi[ZNXX′]_{4-a}$ where R, $a$, Z, X and X′ are as above defined.

2. A process as claimed in claim 1 wherein X and X′ are aryl radicals.

3. A process as claimed in claim 1 wherein the reaction is performed in the presence of one or more solvents.

4. A process as claimed in claim 3 wherein the solvent is diethylether.

5. A process as claimed in claim 1 wherein the reaction is carried out at the reflux temperature of the reaction mixture.

6. A process as claimed in claim 1 wherein the reactant (2) is employed in a stoichiometric excess.

References Cited
UNITED STATES PATENTS

| | | | |
|---|---|---|---|
| 2,715,133 | 8/1955 | Speier | 260—448.2 |
| 2,754,311 | 7/1956 | Elliott | 260—448.2 |
| 2,960,517 | 11/1960 | Schnabel | 260—448.2 |
| 3,247,281 | 4/1966 | Gagliardi | 260—448.2 XR |

TOBIAS E. LEVOW, Primary Examiner

P. F. SHAVER, Assistant Examiner

U.S. Cl. X.R.

252—49.6, 400; 260—448.8